1

3,176,041
SEPARATION OF NAPHTHENIC ACIDS FROM
A PETROLEUM OIL
George W. Ayers, Chicago, and William A. Krewer, Arlington Heights, Ill., assignors to The Pure Oil Company, Palatine, Ill., a corporation of Ohio
No Drawing. Filed Aug. 8, 1961, Ser. No. 129,991
4 Claims. (Cl. 260—514)

This invention relates to a process or sequence of steps for separating naphthenic acids from petroleum oils containing same. This invention also relates to a process for regenerating an adsorbent used in treating a naphthenic acid-containing petroleum oil in combination with either ammonia, a mono-, di-, or tri-alkylamine, a diamine, or a hydrazine. This invention further relates to a process for recovering naphthenic acids from an adsorbent containing adsorbed ammonium naphthenates.

In the preparation of lubricating oils from crude petroleum, lubricating oil stocks are subjected to chemical and physical treatments in order to remove the naphthenic acids contained therein as well as to impart certain desirable properties to the finished products. These naphthenic acids are high-molecular-weight monocarboxylic acids having more than about 25 carbon atoms per molecule. The acids are either liquid and/or solid under ordinary conditions, consist essentially of cyclic and polycyclic acids of alicyclic type, have boiling ranges mainly above about 600° F., and, in general, offer difficulty in their removal and purification. In the past, considerable effort has been expended to devise methods for their removal and purification since their presence in finished lubricants in an amount greater than that corresponding to 0.10 acid neutralization number is considered detrimental, and they find use for a multitude of industrial chemical products. The metallic naphthenates have been found to be highly desirable as driers for paints, as treating agents for cloth, rope, wood, etc., to prevent the growth of fungi, as agents for the resolution of stubborn oil-in-water emulsions, as detergent components, as lubricating oil additives, and as components of a large number of other compositions.

It is desirable that these acidic constituents be removed from the lubricating oil stocks used to prepare lubricating oils. Various extraction methods employing alkali solutions and/or various organic solvents have been utilized in the past to produce lubricating oils having a low naphthenic acid content. However, some lubricating oil stocks contain appreciable quantities of naphthenic acids even after treatment by these methods. In addition, a number of difficulties are encountered, such as the formation of stable emulsions during the treatment, and the solubility of the alkali naphthenate in the oil. Another method used by refiners for reducing the acid neutralization number is contacting the oils with a solid, porous, adsorbent material such as clay at elevated temperatures. It is sometimes difficult to obtain an acid-neutralization-number reduction to a value below 0.1 by clay-contacting, and difficulty also has been experienced in recovering the naphthenic acids from the clay and regenerating it for further use.

The problem of removing substantially all of the naphthenic acids contained in a petroleum oil has ben solved by the process set forth in U.S. patent application 119,303, filed June 26, 1961, by D. H. Sanderson and W. S. Biggers. In this copending application, there is described a process for obtaining a significant reduction in the acid neutralization number of a petroleum oil by contacting the oil simultaneously with a solid, porous adsorbent, such as clay, and ammonia. In addition to ammonia, other nitrogenous compounds of the formula,

may be used with a solid adsorbent to lower the acid neutralization number of oils. In the formula, $R_1$ and $R_2$ are alkyl groups or hydrogen. Examples of alkyl groups include methyl, ethyl, propyl, isopropyl, butyl, and isoamyl groups. $R_3$ may be hydrogen, alkyl groups, the radical,

with $R_1$ and $R_2$ as just defined, or the radical

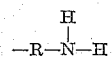

with R being an alkylene group. This formula represents mono-, di-, or tri-alkyl amines, diamines and hydrazines as well as ammonia. It is preferred that the boiling point of the nitrogenous compound utilized in combination with the adsorbent be below 212° F. at 760 mm. pressure to facilitate the removal of the excess nitrogenous compound from the finished oil. Preferred amines include methylamine, dimethylamine, trimethylamine, ethylamine, diethylamine, triethylamine, propylamine, dipropylamine, tripropylamine, isopropylamine, diisopropylamine, triisopropylamine and butylamine.

In the process of the copending application, the acid-neutralization-number reduction is controlled by the type and amount of clay used, time allowed for contacting, contact temperature, contact pressure, the amount of ammonia or other nitrogenous reagent with which the oil is contacted, the partial pressure of ammonia or other nitrogenous reagent over the oil-clay mixture during contacting and filtration, and the type and amount of any stripping gas used in the process while the clay is in contact with the oil.

The solid, porous, adsorbent material which is utilized in the process may, for example, be any acidic- or basic-type clay such as those sold under the trademarks of Palex, Impact, and Filtrol, or other adsorbent such as silica gel, activated charcoal, activated carbon, or activated alumina. If acid-treated clays are used in the process, the treated oils will have lower acid neutralization numbers than if clay which was not acid-treated is used. In general, the amount of adsorbent used will range from about 0.05 to 75 pounds per barrel of oil, the amount varying directly with the acidity of the oil.

The ammonia or other nitrogenous reagent is preferably added to the treating vessel gradually over the entire contacting period. A suitable nonlimiting example of the method of contacting comprises introducing the hydrocarbon oils into the vessel to a desired level, and separately or simultaneously introducing clay-contacting material to the treating vessel while bubbling ammonia through the hydrocarbon oil and clay mixture, while it is under suitable agitation. The amount of ammonia bubbled through the oil should be at least sufficient to stoichiometrically react with the organic acids present in the oil, but preferably should be somewhat in excess of the amount required to neutralize the acids. In general, the amount of ammonia or other nitrogenous reagent may vary from about 0.005 to 20 pounds per barrel of oil, the amount varying directly with the acidity of the oil. The effectiveness of the clay may also be enhanced by being ammoniated prior to the contacting. However, the addition of ammonia to the treating vessel will effect the most significant improvement in the acid number of the oil.

The process is conducted at elevated temperatures, from about 400° to 700° F. Best results are obtained when the temperature is held throughout the contacting period within the range of approximately 450° to 600° F. for lubricating oil and 400° to 675° F. for lubricating-oil extracts. Temperatures lower than about 400° F. will require longer contact periods than are considered practical. Appreciable cracking of the oil may occur if temperatures over about 700° F. are used. A suitable contacting period of approximately 20–75 minutes will produce a satisfactory reduction in the acid neutralization number of the oil.

The pressure may be any found suitable. However, in U.S. patent application Serial No. 328,798 filed December 30, 1952, and now U.S. Patent No. 2,795,535, it is shown that maximum reduction in acid neutralization number of an oil contacted with a solid adsorbent is attained when an anhydrous atmosphere is maintained. One method by which this is accomplished is by carrying out the contacting of the adsorbent-oil slurry at subatmospheric pressure.

In accordance with this invention, we have found that if a solid, porous, adsorbent material is used in combination with ammonia, or other previously described nitrogenous reagent, for treating petroleum oils containing naphthenic acids, the naphthenic acids can be recovered from the adsorbent material. In the process of our invention, the spent adsorbent is first washed with a light hydrocarbon solvent. The adsorbent will then yield material of high naphthenic acid content and the adsorbent is regenerated for further use by heating the washed adsorbent at 400° at 550° F. in a current of inert gas and extracting the naphthenic acids from the adsorbent with a light hydrocarbon solvent. In case recovery of the adsorbent is not necessary, the spent adsorbent may be contacted with aqueous caustic or aqueous alcoholic caustic solution followed by separation of the naphthenic acids from the aqueous solution by the addition of a mineral acid.

It is an object of this invention to provide a process for removing and recovering naphthenic acids contained in a petroleum oil.

Another object of this invention is to provide a process for regenerating a solid, porous, adsorbent used in treating a naphthenic acid-containing petroleum oil in the presence of either ammonia, a mono-, di-, or tri-alkylamine, a diamine, or a hydrazine.

Another object of this invention is to provide a process for recovering naphthenic acids from an adsorbent containing adsorbed ammonium naphthenates.

These and further objects of the invention will become apparent as the description proceeds.

If a petroleum oil containing naphthenic acids is simultaneously treated with an adsorbent, such as clay, and a nitrogenous reagent, such as ammonia, the naphthenic acids are adsorbed by the clay in the form of ammonium naphthenates. Before recovering the naphthenic acids from the spent clay, the clay is first washed with a light hydrocarbon solvent, such as pentane, hexane, heptane, or naphtha, to remove the oil retained thereon. The oil is removed by solution in the solvent, leaving the ammonium naphthenates on the clay. The solvent used in washing the adsorbent may then be subjected to any suitable stripping operation for the purpose of separating the solvent from the oil. The separated oil has an acid neutralization number approximately the same as the finished oil from the ammonia-clay treating operation and the solvent may be used again for washing spent adsorbent.

Different methods may be utilized to recover the naphthenic acids from the solvent-washed adsorbent. In one method, the solvent-washed clay is purged in a current of an inert gas at a temperature of about 400° to 550° F. to decompose the ammonium naphthenates into ammonia and naphthenic acids, the liberated ammonia being carried away by the gas. The naphthenic acids are then separated from the clay by extraction with a light hydrocarbon solvent such as pentane, hexane, heptane, or naphtha, and the clay is separated for further use. Any suitable stripping operation may then be used for recovering the naphthenic acids from the solvent.

Should recovery of the clay not be necessary, the naphthenic acids can be recovered from the solvent-washed clay by contacting the clay with an aqueous or an aqueous-alcoholic solution of caustic to dissolve the adsorbed ammonium naphthenates as alkali metal salts. Although sodium hydroxide is preferred because of its cheapness, other alkali metal hydroxides, such as potassium hydroxide or lithium hydroxide, or any combination of these hydroxides, may be used. The caustic solution used for contacting the solvent-washed clay may have a concentration ranging between about 2% to 20%. The alkali solution may contain an alcohol, such as methanol or ethanol, in a concentration of about 5% to 95%. The alkali solution containing the dissolved alkali metal naphthenates is separated from the clay and acidified to free the organic acids by the addition of an aqueous mineral acid solution having a concentration in the range of 5% to 85%. The naphthenic acids are then extracted from the aqueous solution by a light hydrocarbon solvent.

The process of this invention is applicable to the removal of naphthenic acids from a petroleum oil containing same by the concomitant treatment with any of the adsorbent materials and nitrogenous reagents described above. It is understood that the scope of this invention includes the utilization of compounds that decompose under the conditions of contact treating to yield the nitrogenous reagents.

Any mineral oil fraction having a substantial acidity which it is desirable to remove can be treated by the process of this invention. For example, mineral-oil lubricating stocks, such as neutral oils of any viscosity and bright stocks obtained from any crude oil, may be treated by the process of our invention. The oils may or may not have been first subjected to a standard refining process, such as deasphalting, dewaxing, or solvent refining. The hydrocarbon oil may also be a solvent extract obtained from the solvent refining of a hydrocarbon stock by means of phenol, sulfur dioxide, furfural, or similar agents for extracting aromatics, or any combination of mineral oils, refined or unrefined. In view of their high naphthenic acid content, the process of our invention is very effective in recovering naphthenic acids from extract oils.

It will be apparent to those skilled in the art that in addition to a single-batch extraction or a plurality of batch extractions, various continuous contacting operations can also be employed in the practice of our invention. In order to be able to continuously treat naphthenic acid-containing oil, a plurality of contacting vessels may be used with provision of the necessary manifold system to switch the various fluid streams. For example, three contacting vessels may be utilized, each being employed alternately during the treating, solvent-washing, and acid-recovery phases of the complete cycle.

In order to illustrate the invention, the following examples are given.

*Example I*

A sample of a dewaxed bright stock, having a viscosity of 160 SUS at 210° F. and a viscosity index of 90, was contacted with an acid-treated clay, utilizing a standard, closed-type, contacting vessel. The clay used for contacting the oil was in the amount of 4 pounds per barrel of oil, while nitrogen and 0.04 pound of ammonia per barrel of oil were bubbled through the oil-clay slurry. The charge stock was contacted with the clay and ammonia for 30 minutes at atmospheric pressure at approximately 525° F. After the contacting period, the oil-clay slurry was cooled to 200° F., filtered to separate the clay and the oil, and the acid neutralization number of the oil was determined. The acid neutralization number was reduced from an initial value of 0.31 to 0.04. The spent clay was then washed on a Buchner funnel repeatedly with hexane until the washings were colorless. After the washings had been combined, the hexane was removed by distillation. The residual oil had an acid neutralization number essentially the same as that of the finished bright stock from the ammonia-clay treating operation. The hexane-washed clay was then contacted with an excess of aqueous alcoholic potassium hydroxide, having a 5% alkali concentration, followed by filtering of the mixture and washing the clay with alcohol and water. The filtrate and washings were diluted with water and boiled to remove the alcohol, and then acidified with an aqueous solution of sulfuric acid having a concentration of 50%. The naphthenic acids were extracted with ether. The ether solution yielded naphthenic acids having an acid neutralization number of 45.4. This naphthenic acid product had an assay value of about 50%. The yield of oil from the hexane washings was 1.8 gallons per 100 pounds of spent clay with the yield of crude naphthenic acids being about 1 pound per 100 pounds of spent clay.

*Example II*

An aromatic extract oil, produced as a by-product from the manufacture of neutral oil and having an initial acid neutralization number of 6.5, a viscosity of 61.5 SUS at 210° F., and a viscosity index of negative 56, was treated using the same apparatus and technique applied in Example 1, except that the ammonia dosage was 0.9 pound per barrel of oil, 12 pounds of clay per barrel of oil was used and the clay contacting temperature was 625° F. The naphthenic acids were then recovered from the clay in the manner described in Example I. The treated extract oil had an acid neutralization number of 0.10. An analysis of the recovered naphthenic acids, showed the product to have an acid number of 41.2, which represented a recovery of about 30% of the acids in the oil.

*Example III*

A sample of a dewaxed neutral oil, having an acid number of 0.19, a viscosity of 182 at 100° F., and viscosity index of 100, is contacted with clay and ammonia under the conditions described in Example I, except that the clay contacting temperature is 435° F. The clay is then washed with hexane to remove the retained oil, and the hexane-washed clay is heated at approximately 500° F. in a current of nitrogen for a period of approximately twenty minutes. Thereafter, the clay is again washed with hexane in order to remove the naphthenic acids. The naphthenic acids which are separated from the hexane by distillation have an acid number of 83, representing a recovery of about 30% of the acids.

*Example IV*

Another sample of the dewaxed neutral oil described in Example III is contacted with 4 pounds of acid-treated clay per barrel of oil while nitrogen and 0.04 pound of methylamine is bubbled through the oil-clay slurry. The oil is contacted with the clay and methylamine for 30 minutes at atmospheric pressure at approximately 435° F. The naphthenic acids which are recovered from the clay in the manner described in Example III represent a recovery approximately the same as the recovery in Example III.

The embodiments of the invention in which an exclusive property or privilege is claimed are defined as follows:

1. A process for separating naphthenic acids from a petroleum oil containing same which comprises contacting said oil at elevated temperature simultaneously with adsorbent clay and at least one nitrogenous reagent from the group consisting of ammonia, mono-alkylamines, dialkylamines, trialkylamines, diamines and hydrazines, boiling below 212° F., said clay and reagent being used in such amounts as to synergistically effect the removal of naphthenic acid from the oil by adsorption on the clay, separating the clay containing adsorbed constituents from the oil, washing the separated clay with a light hydrocarbon solvent to remove oil from the clay, heating the washed adsorbent in a current of inert gas at a temperature of 400–550° F., extracting naphthenic acids from the adsorbent, after heating, with a light hydrocarbon solvent, and stripping the solvent from the naphthenic acids.

2. A process according to claim 1 in which said reagent is ammonia.

3. A process according to claim 1 in which said reagent is an alkylamine.

4. A process according to claim 2 in which said oil is simultaneously contacted with about 0.05 to 75 pounds, per barrel of oil, of a solid, adsorbent clay, and ammonia in an amount of about 0.005 to 20 pounds per barrel of oil, for a period of about 20 to 75 minutes at a temperature of about 400° to 700° F.

References Cited by the Examiner

UNITED STATES PATENTS

| | | | |
|---|---|---|---|
| 2,186,249 | 1/40 | Lazar | 260—514 XR |
| 2,301,528 | 11/42 | Ewing | 260—514 XR |
| 2,738,314 | 5/52 | Lewis et al. | 260—514 XR |
| 2,795,535 | 6/57 | Crosby et al. | 260—514 XR |
| 2,808,431 | 10/57 | Fierce | 260—514 XR |

FOREIGN PATENTS

| | | |
|---|---|---|
| 537,884 | 3/57 | Canada. |
| 934,887 | 11/55 | Germany. |

LEON ZITVER, *Primary Examiner.*

CHARLES B. PARKER, *Examiner.*